(12) United States Patent
Sharifi et al.

(10) Patent No.: US 12,294,848 B2
(45) Date of Patent: May 6, 2025

(54) SPATIAL AUDIO FOR DEVICE ASSISTANTS

(71) Applicant: Google LLC, Mountain View, CA (US)

(72) Inventors: Matthew Sharifi, Kilchberg (CH); Victor Carbune, Zürich (CH)

(73) Assignee: Google LLC, Mountain View, CA (US)

( * ) Notice: Subject to any disclaimer, the term of this patent is extended or adjusted under 35 U.S.C. 154(b) by 198 days.

(21) Appl. No.: 18/065,717

(22) Filed: Dec. 14, 2022

(65) Prior Publication Data

US 2024/0205628 A1 Jun. 20, 2024

(51) Int. Cl.
*H04S 7/00* (2006.01)
*G06F 3/16* (2006.01)
*G10L 15/22* (2006.01)

(52) U.S. Cl.
CPC .............. *H04S 7/302* (2013.01); *G06F 3/165* (2013.01); *G10L 15/22* (2013.01)

(58) Field of Classification Search
None
See application file for complete search history.

(56) References Cited

U.S. PATENT DOCUMENTS 10,299,061 B1 * 5/2019 Sheen ..................... G06F 3/165
11,589,184 B1 * 2/2023 Mont-Reynaud ....... H04S 7/304

\* cited by examiner

*Primary Examiner* — Kenny H Truong
(74) *Attorney, Agent, or Firm* — Honigman LLP; Brett A. Krueger; Grant Griffith

(57) ABSTRACT

A method includes, while a user is wearing stereo headphones in an environment, obtaining, from a target digital assistant, a response to a query issued by the user, and obtaining spatial audio preferences of the user. Based on the spatial audio preferences of the user, the method also includes determining a spatially disposed location within a playback sound-field for the user to perceive as a sound-source of the response to the query. The method further includes rendering output audio signals characterizing the response to the query through the stereo headphones to produce the playback sound-field. Here, the user perceives the response to the query as emanating from the sound-source at the spatially disposed location within the playback sound-field.

20 Claims, 10 Drawing Sheets

SPATIAL AUDIO FOR DEVICE ASSISTANTS

TECHNICAL FIELD

This disclosure relates to spatial audio for device assistants.

BACKGROUND

A user's manner of interacting with an assistant-enabled device is designed primarily, if not exclusively, by means of voice input. For example, a user may ask a device to perform an action where the device responds by initiating an operation that matches the user's criteria. In instances where a user issues the request to the device via a controlling device (e.g., smart headphones), interactions between the user and the device may be improved by providing spatial audio support.

SUMMARY

One aspect of the disclosure provides a computer-implemented method that when executed on data processing hardware causes the data processing hardware to perform operations that include, while a user is wearing stereo headphones in an environment, obtaining, from a target digital assistant, a response to a query issued by the user, and obtaining spatial audio preferences of the user. Based on the spatial audio preferences of the user, the operations also include determining a spatially disposed location within a playback sound-field for the user to perceive as a sound-source of the response to the query. The operations also include rendering output audio signals characterizing the response to the query through the stereo headphones to produce the playback sound-field, wherein the user perceives the response to the query as emanating from the sound-source at the spatially disposed location within the playback sound-field.

Implementations of the disclosure may include one or more of the following optional features. In some implementations, the spatial audio preferences of the user include a digital assistant mapping that maps each digital assistant in a group of one or more available digital assistants associated with the user to a respective different spatially disposed location within playback sound-fields produced by the stereo headphones. Here, the group of the one or more available digital assistants include the target digital assistant. Additionally, determining the spatially disposed location within the playback sound-field for the user to perceive as the sound-source includes selecting the spatially disposed location as the respective different spatially disposed location that maps to the target digital assistant in the group of the one or more available digital assistants. In these implementations, the operations may further include receiving audio data characterizing a spoken utterance of the query issued by the user and captured by a microphone of the stereo headphones, the query including a command for the target digital assistant to perform an operation, and executing a digital assistant arbitration routine to identify the target digital assistant among the group of the one or more available digital assistants to perform the operation. In these implementations, the audio data characterizing the utterance may include metadata identifying a particular direction the user was facing when the user spoke the utterance of the query, the spatial audio preferences of the user may further include a user directional mapping that maps each of a plurality of different predefined directions to a respective digital assistant in the group of the one or more available digital assistants. Here, the digital assistant arbitration routine identifies the target digital assistant based on matching the particular direction identified by the metadata with the predefined direction in the user directional mapping that maps to the target digital assistant. In other implementations, the spatial audio preferences of the user further include a phrase mapping that maps each of a plurality of different predefined phrases to a respective digital assistant in the group of the one or more available digital assistants. Here, the digital assistant arbitration routine identifies the target digital assistant based on at least one of a particular phrase detected in the audio data that matches the predefined phrase in the phrase mapping that maps to the target digital assistant, or the particular phrase recognized in a transcription of the audio data that matches the predefined phrase in the phrase mapping that maps to the target digital assistant.

Another aspect of the disclosure provides a system including data processing hardware and memory hardware in communication with the data processing hardware. The memory hardware stores instructions that when executed by the data processing hardware cause the data processing hardware to perform operations that include, while a user is wearing stereo headphones in an environment, obtaining, from a target digital assistant, a response to a query issued by the user, and obtaining spatial audio preferences of the user. Based on the spatial audio preferences of the user, the operations also include determining a spatially disposed location within a playback sound-field for the user to perceive as a sound-source of the response to the query. The operations also include rendering output audio signals characterizing the response to the query through the stereo headphones to produce the playback sound-field, wherein the user perceives the response to the query as emanating from the sound-source at the spatially disposed location within the playback sound-field.

This aspect may include one or more of the following optional features. In some implementations, the spatial audio preferences of the user include a digital assistant mapping that maps each digital assistant in a group of one or more available digital assistants associated with the user to a respective different spatially disposed location within playback sound-fields produced by the stereo headphones. Here, the group of the one or more available digital assistants include the target digital assistant. Additionally, determining the spatially disposed location within the playback sound-field for the user to perceive as the sound-source includes selecting the spatially disposed location as the respective different spatially disposed location that maps to the target digital assistant in the group of the one or more available digital assistants. In these implementations, the operations may further include receiving audio data characterizing a spoken utterance of the query issued by the user and captured by a microphone of the stereo headphones, the query including a command for the target digital assistant to perform an operation, and executing a digital assistant arbitration routine to identify the target digital assistant among the group of the one or more available digital assistants to perform the operation. In these implementations, the audio data characterizing the utterance may include metadata identifying a particular direction the user was facing when the user spoke the utterance of the query, the spatial audio preferences of the user may further include a user directional mapping that maps each of a plurality of different predefined directions to a respective digital assistant in the group of the one or more available digital assistants. Here, the digital assistant arbitration routine identifies the target digital assistant based on matching the particular direction identified by the metadata with the predefined direction in the user directional mapping that maps to the target digital assistant. In other implementations, the spatial audio preferences of the user further include a phrase mapping that maps each of a plurality of different predefined phrases to a respective digital assistant in the group of the one or more available digital assistants. Here, the digital assistant arbitration routine identifies the target digital assistant based on at least one of a particular phrase detected in the audio data that matches the predefined phrase in the phrase mapping that maps to the target digital assistant, or the particular phrase recognized in a transcription of the audio data that matches the predefined phrase in the phrase mapping that maps to the target digital assistant.

Another aspect of the disclosure provides a computer-implemented method that when executed on data processing hardware causes the data processing hardware to perform operations that include, while a user is wearing stereo headphones in an environment, the stereo headphones including a pair of integrated loudspeakers each disposed proximate to a respective ear of the user, receiving audio data characterizing a query spoken by the user and captured by a microphone of the stereo headphones, the query requesting a digital assistant to perform an operation, and obtaining, from the digital assistant, a response to the query, the response conveying response information related to performance of the operation. The operations also include determining a particular direction for a user-perceived source of the response information relative to the stereo headphones, the user-perceived source located within the environment, and rendering output audio signals characterizing the response to the query through the stereo headphones to produce a spatial playback sound-field that maps the particular direction for the user-perceived source to a spatially disposed location within the spatial playback sound-field. Here, the user perceives the response to the query as emanating from the spatially disposed location within the spatial playback sound-field.

This aspect may include one or more of the following optional features. In some implementations, the operations further include obtaining proximity information associated with the headphones and each of a plurality of assistant-enabled devices located within the environment, each corresponding assistant-enabled device of the plurality of assistant-enabled devices in communication with the stereo headphones, and executing an arbitration process to identify which one of the plurality of assistant-enabled devices includes the user-perceived source. Here, determining the particular direction for the user-perceived source relative to the stereo headphones is based on the proximity information associated with the headphones and the identified assistant-enabled device that includes the user-perceived source. In these implementations, the operations may further include obtaining a directional orientation of the stereo headphones when the user spoke the query, the arbitration processes identifying the assistant-enabled device that includes the user-perceived source based on the directional orientation of the stereo headphones and the proximity information associated with the stereo headphones and each of the plurality of assistant-enabled devices. In these implementations, obtaining the directional orientation of the stereo headphones includes receiving directionality information measured by one or sensors implemented on the stereo headphones, and determining the directional orientation of the stereo headphones when the user spoke the query based on the directionality information measured by the one or more sensors implemented on the stereo headphones. Additionally or alternatively, at least one assistant-enabled device of the plurality of assistant-enabled devices within the environment captures, via a respective array of microphones, streaming audio containing the query spoken by the user, performs beamforming on the captured streaming audio to extract the directional orientation of the stereo headphones relative to the at least one assistant-enabled device. Here, obtaining the directional orientation of the stereo headphones includes receiving the directional orientation of the stereo headphones extracted by the at least one assistant-enabled device.

In some examples, the operations further include obtaining a transcription of the query spoken by the user, and performing query interpretation on the transcription. Here, the arbitration processes identifies the assistant-enabled device that includes the user-perceived source based on the query interpretation performed on the transcription. Additionally or alternatively, each corresponding assistant-enabled device of the plurality of assistant-enabled devices is configured to perform a respective set of available operations, where identifying the assistant-enabled device that includes the user-perceived source is further based on the respective set of available operations associated with each corresponding assistant-enabled device of the plurality of assistant-enabled devices. In these examples, the operations may further include determining, based on the proximity information associated with the stereo headphones and the identified assistant-enabled device that includes the user-perceived source, a distance score associated with the user-perceived source. Here, the distance score indicates a distance between the stereo headphones and the user-perceived source, and adjusting a volume level of the spatial playback sound-field is based on the distance score associated with the user-perceived source.

In some implementations, the operations further include determining another particular direction for another user-perceived source of the response information relative to the stereo headphones, the other user-perceived source located in the environment at a different location than the user-perceived source. Here, the spatial playback sound-field produced by rendering the output audio signals through the stereo headphones further maps the other particular direction for the other user-perceived source to a different spatially disposed location within the spatial playback sound-field, and the user also perceives the response to the query as emanating from the different spatially disposed location within the spatial playback sound-field. In some examples, the operations further include, while the user is wearing the stereo headphones, receiving a notification for the user issued by an assistant-enabled device located in the environment, and determining a particular direction for the assistant-enabled device relative to the stereo headphones. These operations also include rendering another output audio signal characterizing the notification through the stereo headphones to produce another spatial playback sound-field that maps the particular direction for the assistant-enabled device to another spatially disposed location within the spatial playback sound-field. Here, the user perceives the notification as emanating from the other spatially disposed location within the other spatial playback sound-field.

Another aspect of the disclosure provides a system including data processing hardware and memory hardware in communication with the data processing hardware. The memory hardware stores instructions that when executed by the data processing hardware cause the data processing hardware to perform operations that include, while a user is wearing stereo headphones in an environment, the stereo headphones including a pair of integrated loudspeakers each disposed proximate to a respective ear of the user, receiving audio data characterizing a query spoken by the user and captured by a microphone of the stereo headphones, the query requesting a digital assistant to perform an operation, and obtaining, from the digital assistant, a response to the query, the response conveying response information related to performance of the operation. The operations also include determining a particular direction for a user-perceived source of the response information relative to the stereo headphones, the user-perceived source located within the environment, and rendering output audio signals characterizing the response to the query through the stereo headphones to produce a spatial playback sound-field that maps the particular direction for the user-perceived source to a spatially disposed location within the spatial playback sound-field. Here, the user perceives the response to the query as emanating from the spatially disposed location within the spatial playback sound-field.

This aspect may include one or more of the following optional features. In some implementations, the operations further include obtaining proximity information associated with the headphones and each of a plurality of assistant-enabled devices located within the environment, each corresponding assistant-enabled device of the plurality of assistant-enabled devices in communication with the stereo headphones, and executing an arbitration process to identify which one of the plurality of assistant-enabled devices includes the user-perceived source. Here, determining the particular direction for the user-perceived source relative to the stereo headphones is based on the proximity information associated with the headphones and the identified assistant-enabled device that includes the user-perceived source. In these implementations, the operations may further include obtaining a directional orientation of the stereo headphones when the user spoke the query, the arbitration processes identifying the assistant-enabled device that includes the user-perceived source based on the directional orientation of the stereo headphones and the proximity information associated with the stereo headphones and each of the plurality of assistant-enabled devices. In these implementations, obtaining the directional orientation of the stereo headphones includes receiving directionality information measured by one or more sensors implemented on the stereo headphones, and determining the directional orientation of the stereo headphones when the user spoke the query based on the directionality information measured by the one or more sensors implemented on the stereo headphones. Additionally or alternatively, at least one assistant-enabled device of the plurality of assistant-enabled devices within the environment captures, via a respective array of microphones, streaming audio containing the query spoken by the user, performs beamforming on the captured streaming audio to extract the directional orientation of the stereo headphones relative to the at least one assistant-enabled device. Here, obtaining the directional orientation of the stereo headphones includes receiving the directional orientation of the stereo headphones extracted by the at least one assistant-enabled device.

In some examples, the operations further include obtaining a transcription of the query spoken by the user, and performing query interpretation on the transcription. Here, the arbitration processes identifies the assistant-enabled device that includes the user-perceived source based on the query interpretation performed on the transcription. Additionally or alternatively, each corresponding assistant-enabled device of the plurality of assistant-enabled devices is configured to perform a respective set of available operations, where identifying the assistant-enabled device that includes the user-perceived source is further based on the respective set of available operations associated with each corresponding assistant-enabled device of the plurality of assistant-enabled devices. In these examples, the operations may further include determining, based on the proximity information associated with the stereo headphones and the identified assistant-enabled device that includes the user-perceived source, a distance score associated with the user-perceived source. Here, the distance score indicates a distance between the stereo headphones and the user-perceived source, and adjusting a volume level of the spatial playback sound-field is based on the distance score associated with the user-perceived source.

In some implementations, the operations further include determining another particular direction for another user-perceived source of the response information relative to the stereo headphones, the other user-perceived source located in the environment at a different location than the user-perceived source. Here, the spatial playback sound-field produced by rendering the output audio signals through the stereo headphones further maps the other particular direction for the other user-perceived source to a different spatially disposed location within the spatial playback sound-field, and the user also perceives the response to the query as emanating from the different spatially disposed location within the spatial playback sound-field. In some examples, the operations further include, while the user is wearing the stereo headphones, receiving a notification for the user issued by an assistant-enabled device located in the environment, and determining a particular direction for the assistant-enabled device relative to the stereo headphones. These operations also include rendering another output audio signal characterizing the notification through the stereo headphones to produce another spatial playback sound-field that maps the particular direction for the assistant-enabled device to another spatially disposed location within the spatial playback sound-field. Here, the user perceives the notification as emanating from the other spatially disposed location within the other spatial playback sound-field.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

A user's manner of interacting with an assistant-enabled device is designed primarily, if not exclusively, by means of voice input. For example, a user may ask a device to perform an action where the device responds by initiating an operation that matches the user's criteria. In instances where a user issues the request to the device via a controlling device (e.g., smart headphones), interactions between the user and the device may be improved by providing spatial audio support. Particularly with smart headphones, that are increasingly designed to support spatial audio, generating responses to the user that leverage spatial audio capabilities allows for more natural interactions. Smart headphones may encompass headset devices in which a pair of loud speakers are each mounted proximate to a respective ear of a user wearing the headset.

In scenarios where the responses from digital assistants within an environment of the user are conveyed through stereo audio, the user obtains valuable information such as which assistant and/or device is responding to queries, as well as a general location/direction of the responding device. Additionally, applying spatial audio to query responses allows a user to issue queries to devices that are not directly in the space. In other words, the user may issue a query to a device that may be too far away from the user to capture the query in streaming audio, whereby the device is in communication via a digital assistant with the headphones that captures the queries to enable the headphones/digital assistant to route the query to the device. Moreover, applying spatial audio to query responses may aid a user in identifying a location of a portable device (e.g., a smart speaker) that is misplaced.

Implementations herein are directed toward receiving a response to a query, and applying spatial audio to the response to place the responding device and/or assistant in a semantically meaningful position within the space surrounding the user. To determine the spatial location in which to place the response, an arbitration procedure is performed to identify which assistant and/or device generated the response. For example, a user may set a timer, and while the timer is running, walk to a different room. When the timer ends, the timer may notify the user. The arbitration procedure may identify the timer that is notifying the user, and audibly playback the notification in a playback sound field indicating the location and/or direction the user was facing (e.g., toward the kitchen timer) when the timer was set.

Figure 1A:
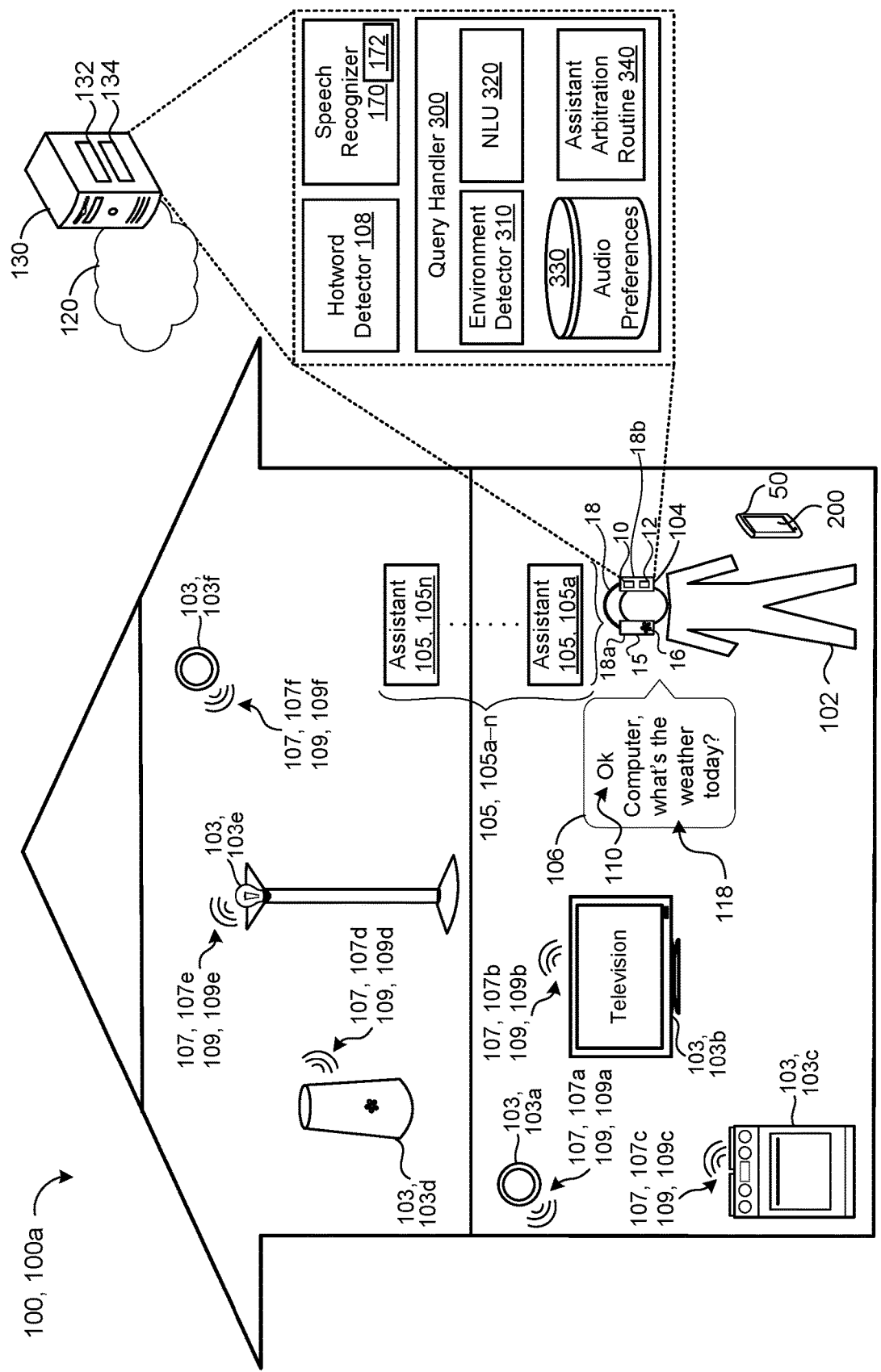
FIGS. 1A-1C are schematic views of an example system including applying spatial audio to responses received from assistant-devices located within an environment.
Figure 1B:
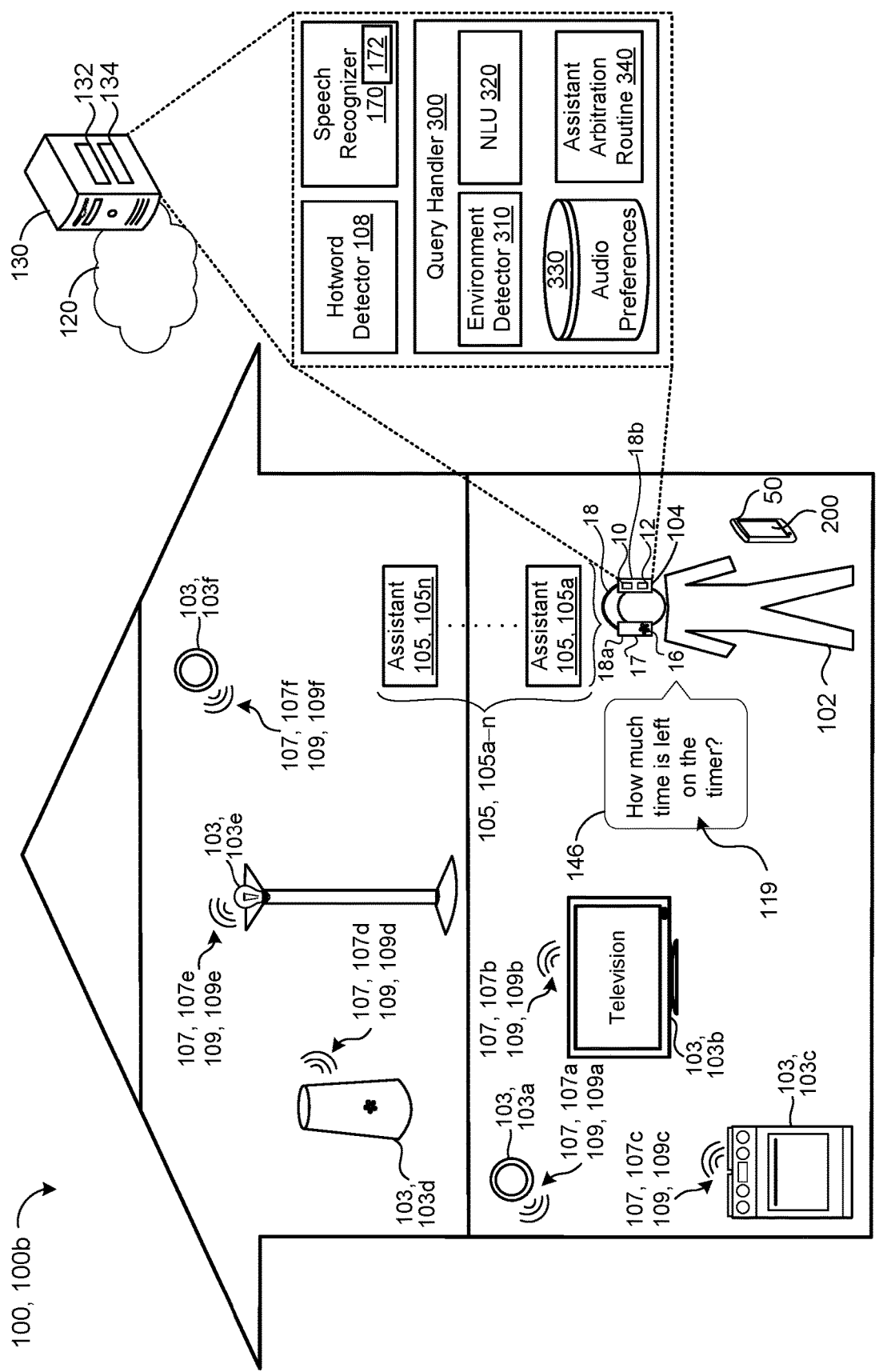
Figure 1C:
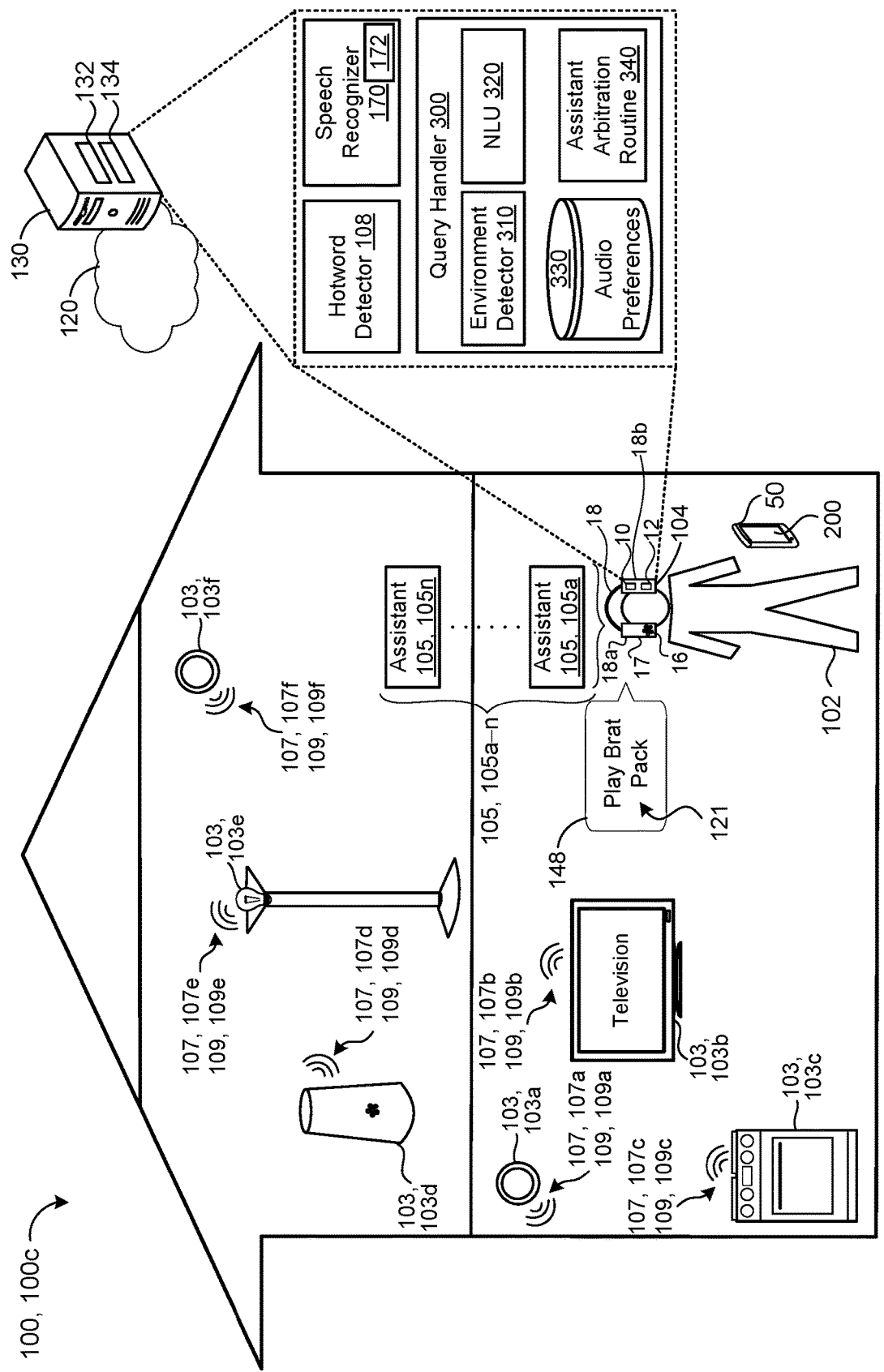
Figure 3:
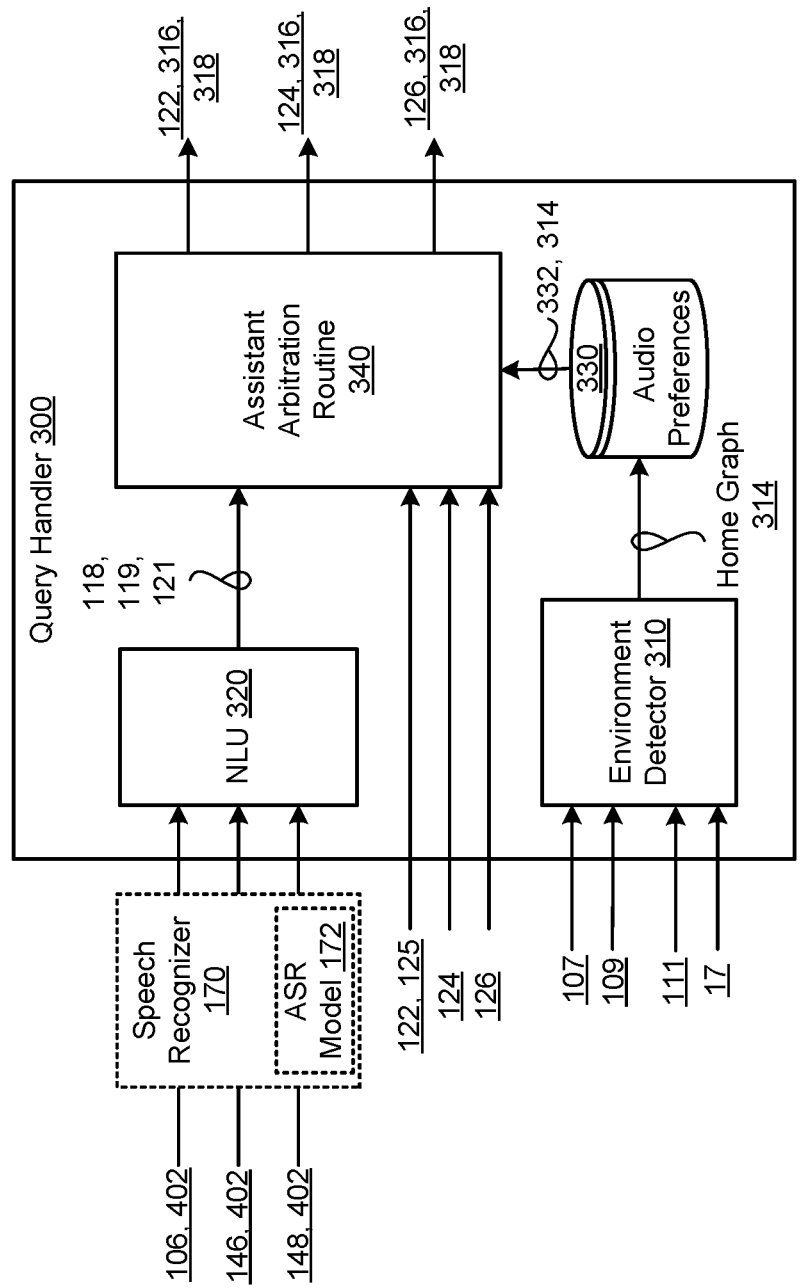
FIG. 3 is a schematic view of a query handling process.

FIGS. 1A-1C illustrate example systems 100a-c for handling queries from a user 102 wearing assistant-enabled headphones 104 (also referred to as stereo headphones 104 and/or an assistant-enabled device (AED) 104) in an environment with multiple AEDs 103 by using spatial audio to give the effect that responses to the queries come from a particular location in the environment. Briefly, and as described in more detail below, a digital assistant 105 including a query handler 300 (FIG. 3) detects multiple AEDs 103, 103a-f within the environment, and obtains a response 122 to receiving a first query 106, "Ok computer, what's the weather today?" issued by a user 102 while wearing the assistant-enabled headphones 104. Because the response 122 conveys response information 125 to the query handler 300, the query handler 300 renders output audio signals characterizing the response 122 through the stereo headphones 104, where the user 102 perceives the response 122 to the query 106 as emanating from a spatially disposed location 318 (FIG. 3) within a spatial playback sound-field 316 (FIG. 3).

The systems 100a-100c include the AED 104 and a plurality of assistant-enabled devices (AEDs) 103, 103a-n located throughout the environment. In the examples shown, the environment may correspond to a home having a first floor and second floor, in which the user 102 wearing the assistant-enabled headphones 104 (i.e., AED 104), a first smart thermostat 103a, a smart television 103b, and a smart oven 103c are located on the first floor, and a smart speaker 103d, a smart light 103e, and a second smart thermostat 103f are located on the second floor. However, the AEDs 103 can include other computing devices, such as, without limitation, a smart phone, tablet, smart display, desktop/laptop, smart watch, smart glasses/headset, smart appliance, smart headphones, or vehicle infotainment device. As shown, the assistant-enabled headphones 104 execute a group of digital assistants 105, 105a-n enabled for simultaneous execution on the assistant-enabled headphones 104. Each digital assistant 105 may correspond to a respective application executing on the assistant-enabled headphones 104 that the multiple users 102 may interact with by issuing queries including commands to perform an operation. In the examples shown in FIGS. 2A-2C, the assistant-enabled headphones 104 include a general assistant 105a (e.g., a pre-programmed assistant 105) and a music assistant 105b. The assistant-enabled headphones 104 includes data processing hardware 10 and memory hardware 12 storing instructions that when executed on the data processing hardware 10 cause the data processing hardware 10 to perform operations. In some examples, the assistant-enabled headphones 104 are configured to communicate with a remote system 130 via a network 120. The remote system 130 may include remote resources, such as remote data processing hardware 132 (e.g., remote servers or CPUs) and/or remote memory hardware 134 (e.g., remote databases or other storage hardware). As shown, a digital assistant 105 executes on the assistant-enabled headphones 104 that the user 102 in the environment may interact with by issuing queries including commands to perform operations. However, in some implementations, the digital assistant 105 executes on one of the AEDs 103 and/or on the remote system 130 in communication with assistant-enabled headphones 104.

The assistant-enabled headphones 104 include an array of one or more microphones 16 configured to capture acoustic sounds such as speech directed toward the assistant-enabled headphones 104. The assistant-enabled headphones 104 also include, an audio output device (e.g., a pair of integrated loudspeakers) 18a, 18b each disposed proximate to a respective ear of the user 102 that may output audio such as music and/or synthesized speech from the digital assistant 105. Here, the digital assistant 105 generates a left-channel audio signal (not illustrated) and a right-channel audio signal (not illustrated) which are connected to the assistant-enabled headphones 104 such that assistant-enabled headphones 104 audibly render the left-channel signal into the left ear via the loudspeaker 18a and the right-channel signal into the right ear via the loudspeaker 18b.

The assistant-enabled headphones 104 may communicate with each of the AEDs 103 via wireless connections that use standard communications technologies and/or protocols. Thus, the network 120 can include Wireless Fidelity (WiFi)

(e.g., 802.11), worldwide interoperability for microwave access (WiMAX), 3G, 4G, Long Term Evolution (LTE), 5G, digital subscriber line (DSL), Bluetooth, Near Field Communication (NFC), or any other wireless standards. The environment may include one or more access points (AP) (not shown) configured to facilitate wireless communication between the assistant-enabled headphones 104 and one or more of the AEDs 103, 103a-f.

In some implementations, each AED 103 broadcasts proximity information 107, 107a-f, directionality information 109, 109a-f, and/or device context 111 receivable by an environment detector 310 (FIG. 3) that the digital assistant 105 executing on the assistant-enabled headphones 104 may use to determine the presence of each AED 103 within the environment. The digital assistant 105 may additionally use the proximity information 107 and/or the directionality information 109 of each AED 103 to infer a home graph 314 to understand the spatial proximity and direction of each AED 103 relative to the assistant-enabled headphones 104 executing the digital assistant 105 (e.g., for determining a direction from which the response 122 in the assistant-enabled headphones 104 should emanate). The proximity information 107 from each AED 103 may include wireless communication signals, such as WiFi, Bluetooth, or Ultrasonic, in which the signal strength of the wireless communication signals received by the environment detector 310 may correlate proximities (e.g. distances) of the secondary AED 103 relative to the assistant-enabled headphones 104. Additionally or alternatively, the proximity information 107 and/or the directionality information 109 from each AED 103 may be determined by playing a fixed sound at the assistant-enabled headphones 104 to determine which of the AEDs 103 in the environment detect the fixed sound to establish an approximate distance between the assistant-enabled headphones 104 and the AEDs 103. In some implementations, the assistant-enabled headphones 104 obtains the directionality information 109 for each AED 103 by receiving at the microphone 16 (e.g., sensor) in an array of microphones 16, a wireless communication signal transmitted by each AED 103 and determining the directionality information 109 based on a respective signal strength of the wireless communication signal received at each microphone 16 (e.g., sensor) in the array of microphones 16 relative to the respective signal strengths of the wireless communication signals received at the other microphones 16 in the array of microphones 16. For example, the directionality information 109 may indicate that the user 102 wearing the assistant-enabled headphones 104 is not facing, or pointed toward, a particular AED 103. Conversely, the directionality information 109 may indicate that the user 102 wearing the assistant-enabled headphones 104 is facing, or pointed toward a particular AED 103. This may serve as a strong indicator that the user 102 intends for the particular AED 103 to perform the operation. In some examples, the device context 111 includes the respective set of available operations the AED 103 is configured to perform. For example, the AED 103d (i.e., the smart speaker 103d) may be configured to output music playback, but not video.

The assistant-enabled headphones 104 may further include a sensor system 15 configured to capture motion sensor data 17 of the assistant-enabled headphones 104. The assistant-enabled headphones 104 may continuously, or at least during periodic intervals, receive the motion sensor data 17 captured by the sensor system 15 to determine a direction or movement of the user 102 wearing the assistant-enabled headphones 104. The motion sensor data 17 may include gyroscope data and/or accelerometer data that characterizes movement of the assistant-enabled headphones 104.

In some configurations, the digital assistant 105 is in communication with a user device 50 associated with the user 102. In the examples shown, the user device 50 includes a smart phone that the user 102 may interact with. However, the user device 50 can include other computing devices, such as, without limitation, a smart watch, smart display, smart glasses, a smart phone, smart glasses/headset, tablet, smart appliance, headphones, a computing device, a smart speaker, or another assistant-enabled device. The user device 50 may include at least one microphone residing on the user device 50 that is in communication with the digital assistant 105. In these configurations, the user device 50 may also be in communication with the one or more microphones 16 residing on the assistant-enabled headphones 104. Additionally, the user 102 may control and/or configure the assistant-enabled headphones 104 and/or the AEDs 103, as well as interact with the digital assistant 105, using an interface 200, such as a graphical user interface (GUI) 200 (FIGS. 2A-2C) rendered for display on a screen of the user device 50.

As shown in FIGS. 1A-1C and 3, the digital assistant 105 implementing the query handler 300 manages queries issued by the user 102 using the assistant arbitration routine 340. In some implementations, the assistant arbitration routine 340 executes an arbitration process to identify a user-perceived source of an AED 103 that provides a response to a query issued by the user 102 in the environment. In other words, the query handler 300 not only obtains responses to queries, but may also determines a direction and/or an identity of the AED 103 for a source of the responses. In the examples in FIGS. 1A-1C, the environment detector 310 may identify the AEDs 103a-f via proximity information 107 and/or directionality information 109 received from the respective AEDs 103. Thereafter, the environment detector 310 generates a home graph 314 including the identities and locations of the AEDs 103 within the current environment relative to the assistant-enabled headphones 104.

In some implementations, the query handler 300 includes an audio preferences data store 330 (e.g., stored on the memory hardware 12). The audio preferences data store 330 may include spatial audio preferences 332 of the user 102 that are used to identify a spatially disposed location 318 in a playback sound-field 316 produced by the assistant-enabled headphones 104. For example, the spatial audio preferences 332 may include a digital assistant mapping that maps each digital assistant 105 in a group of one or more available digital assistants 105, 105a-n associated with the user 102 to a different spatially disposed location within playback sound-fields produced by the assistant-enabled headphones 104. Additionally, the spatial audio preferences 332 may include a user directional mapping that maps each of a plurality of different predefined directions to a respective digital assistant 105 in the group of one or more available digital assistants 105. Similarly, the spatial audio preferences 332 may include a phrase mapping that maps each of a plurality of different predefined phrases to respective digital assistant 105 in the group of one or more available digital assistants 105, 105a-n associated with the user 102. Additionally or alternatively, the home graph 314 may be added to the audio preferences data store 330, where the spatial audio preferences 332 include the proximity information 107 and/or directionality information 109 for the AEDs 103 with respect to the assistant-enabled headphones 104.

Figure 2A:
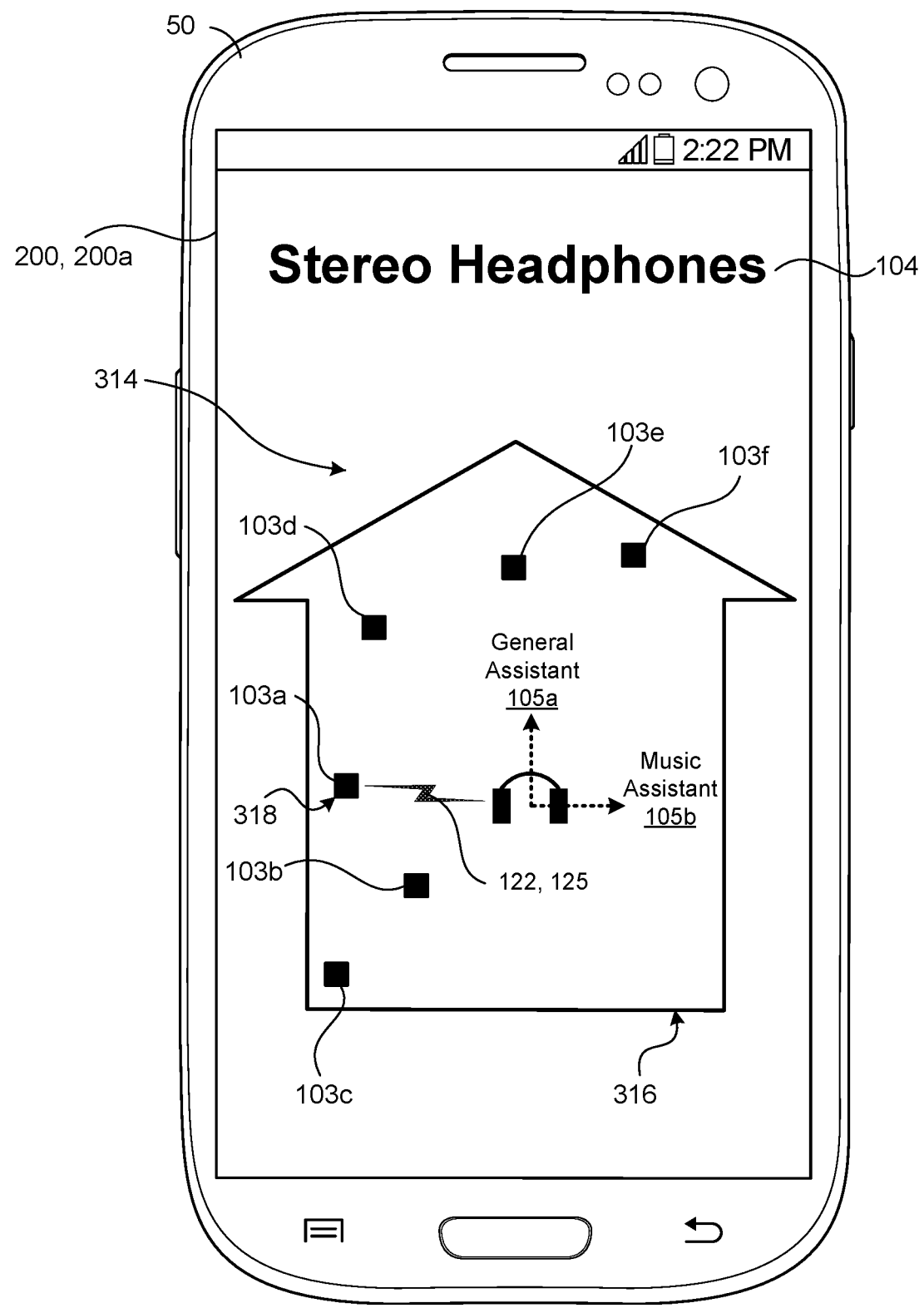
FIGS. 2A-2C are example graphical user interfaces (GUIs) rendered on a screen of a user device to display the spatial playback-sound field of the assistant-devices within the environment.
Figure 2B:
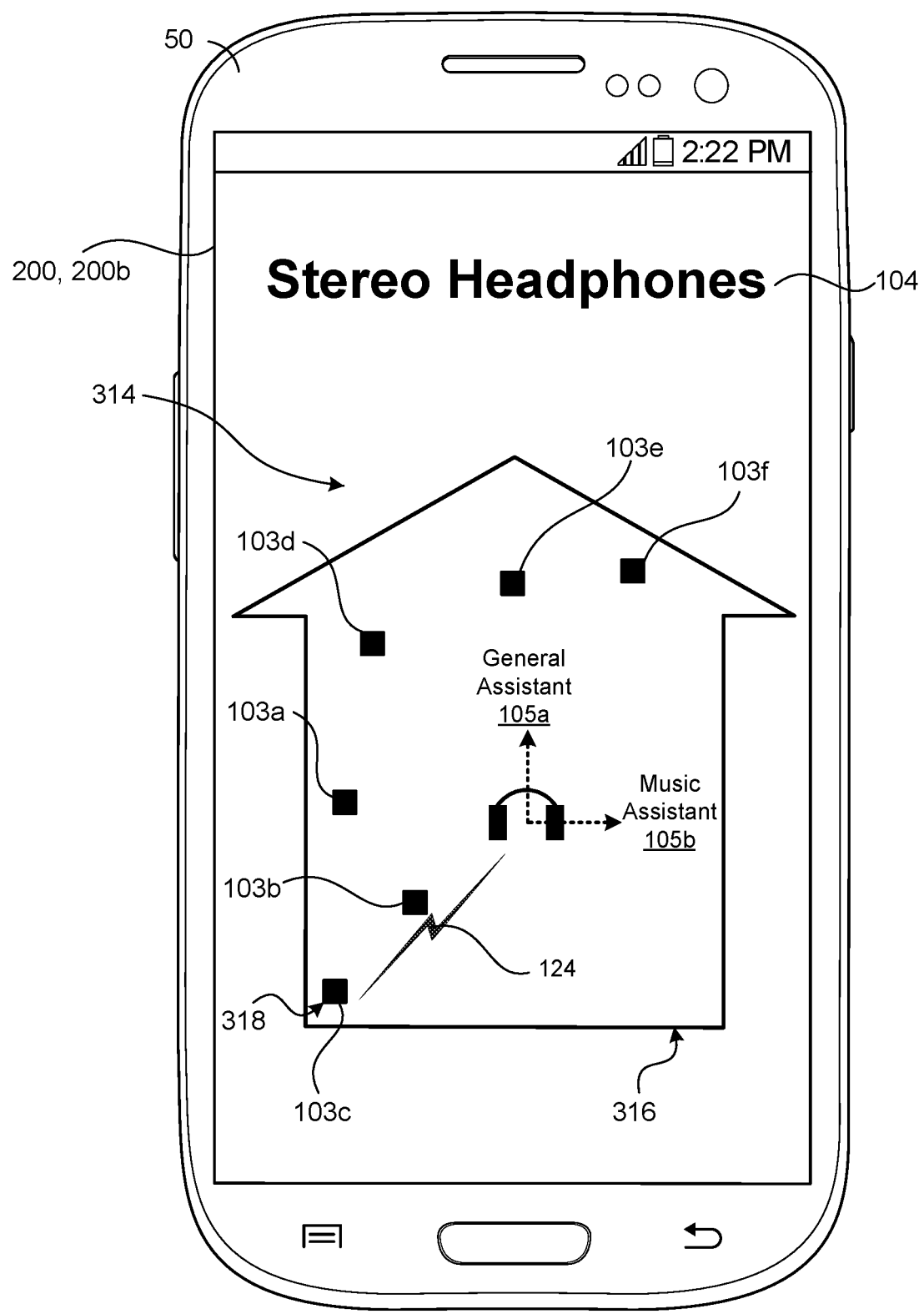
Figure 2C:
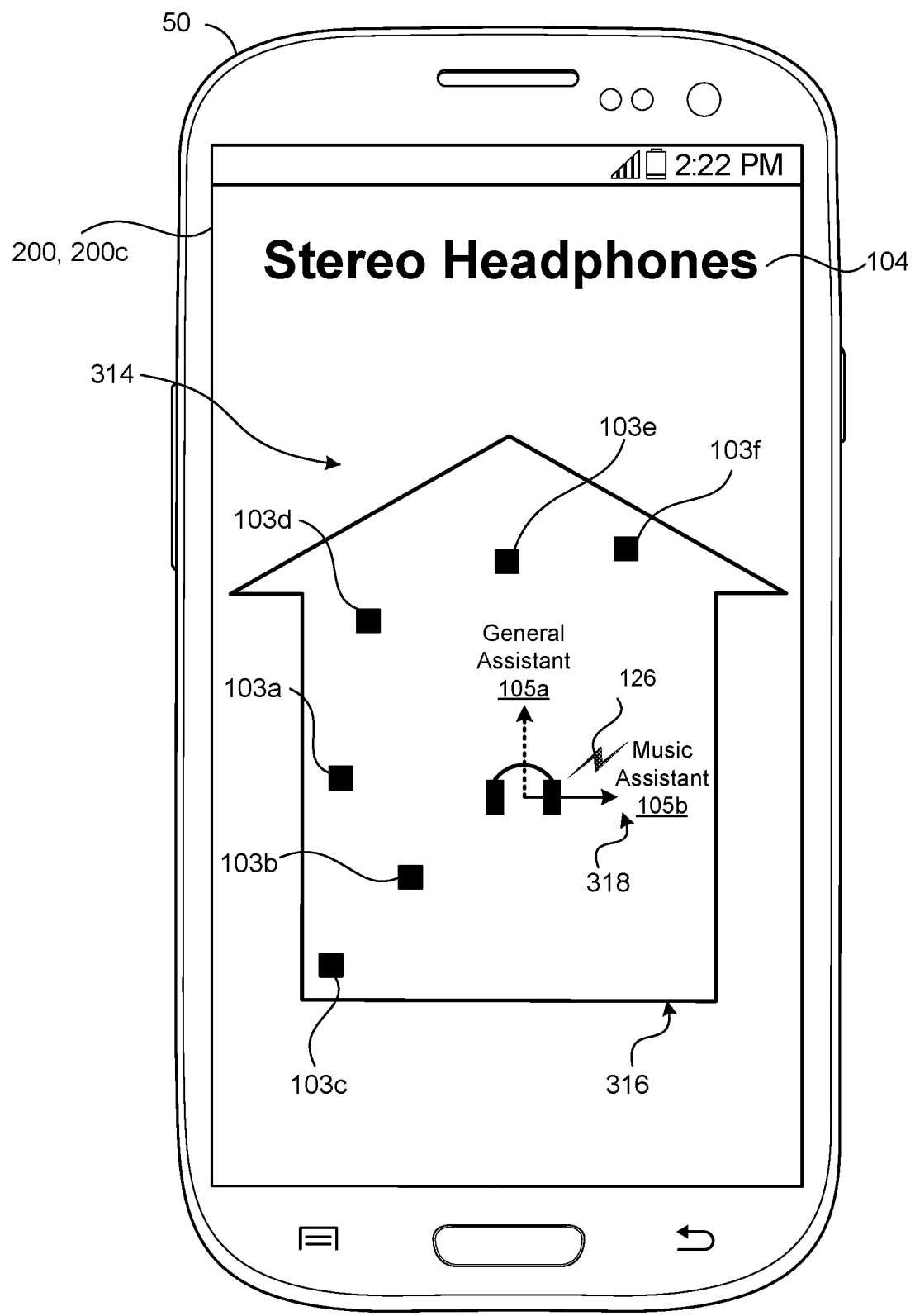

FIGS. 2A-2C show example GUIs 200a-c rendered on the screen of the user device 50 to display a respective home graph 314 of the AEDs 103 within the environment of FIGS. 1A-1C. That is, the GUI 200a of FIG. 2A shows the home graph 314 of the AEDs 103 relative to the assistant-enabled headphones 104, and the source of the response (i.e., AED 103a) identified by the assistant-arbitration routine 340 in FIG. 1A. The GUI 200b of FIG. 2B shows the home graph 314 of the AEDs 103 relative to the assistant-enabled headphones 104, and the source of the response (i.e., AED 103c) identified by the assistant-arbitration routine 340 in FIG. 1B. The GUI 200c of FIG. 2C shows the home graph 314 of the AEDs 103 relative to the assistant-enabled headphones 104, and the source of the response (i.e., music assistant 105b) identified by the assistant-arbitration routine 340 in FIG. 1C. As will become apparent, the location of the AED 103 providing a response to the user 102 rendered in each of the respective GUIs 200a-c changes based on which AED 103 is invoked by the user 102 in FIGS. 1A-1C.

Continuing with the example in FIG. 1A, the user 102 is shown issuing a first query 106, "Ok computer, what's the weather today?" while wearing the assistant-enabled headphones 104. Here, the first query 106 issued by the user 102 is spoken by the user 102 and includes audio data 402 (FIG. 3) corresponding to the first query 106. The first query 106 may further include a user input indication indicating a user intent to issue the first query, via any one of touch, speech, gesture, gaze, and/or an input device (e.g., mouse or stylus) for interacting with the assistant-enabled headphones 104. In other implementations, the user 102 issues the first query 106 without speaking. In these implementations, the user 102 issues the first query 106 via a user device 50 associated with the user 102 (e.g., entering text corresponding to the first query 106 into the GUI 200 displayed on the screen of the user device 50 associated with the user 102, selecting the first query 106 displayed on the screen of the user device 50, etc.).

The microphone 16 of the assistant-enabled headphones 104 receives the first query 106 and processes the audio data 402 that corresponds to the first query 106. The initial processing of the audio data 402 may involve filtering the audio data 402 and converting the audio data 402 from an analog signal to a digital signal. As the assistant-enabled headphones 104 process the audio data 402, the assistant-enabled headphones 104 may store the audio data 402 in a buffer of the memory hardware 12 for additional processing. With the audio data 402 in the buffer, the assistant-enabled headphones 104 may use a hotword detector 108 to detect whether the audio data 402 includes the hotword. The hotword detector 108 is configured to identify hotwords that are included in the audio data 402 without performing speech recognition on the audio data 402.

In some implementations, the hotword detector 108 is configured to identify hotwords that are in the initial portion of the first query 106. In this example, the hotword detector 108 may determine that the first query 106 "Ok computer, what's the weather today?" includes the hotword 110 "ok computer" if the hotword detector 108 detects acoustic features in the audio data 402 that are characteristic of the hotword 110. The acoustic features may be mel-frequency cepstral coefficients (MFCCs) that are representations of short-term power spectrums of the first query 106 or may be mel-scale filterbank energies for the first query 106. For example, the hotword detector 108 may detect that the first query 106 "Ok computer, what's the weather today?" includes the hotword 110 "ok computer" based on generating MFCCs from the audio data 402 and classifying that the MFCCs include MFCCs that are similar to MFCCs that are characteristic of the hotword "ok computer" as stored in a hotword model of the hotword detector 108. As another example, the hotword detector 108 may detect that the first query 106 "Ok computer, what's the weather today?" includes the hotword 110 "ok computer" based on generating mel-scale filterbank energies from the audio data 402 and classifying that the mel-scale filterbank energies include mel-scale filterbank energies that are similar to mel-scale filterbank energies that are characteristic of the hotword "ok computer" as stored in the hotword model of the hotword detector 108.

When the hotword detector 108 determines that the audio data 402 that corresponds to the first query 106 includes the hotword 110, the AED 104 may trigger a wake-up process to initiate speech recognition on the audio data 402 that corresponds to the first query 106. For example, FIG. 3 shows the assistant-enabled headphones 104 including a speech recognizer 170 employing an automatic speech recognition model 172 that may perform speech recognition or semantic interpretation on the audio data 402 that corresponds to the first query 106. The speech recognizer 170 may perform speech recognition on the portion of the audio data 402 that follows the hotword 110. In this example, the speech recognizer 170 may identify the words "what's the weather today" in the first query 106.

The query handler 300 may execute on the remote system 130 in addition to, or in lieu of the assistant-enabled headphones 104. The assistant-enabled headphones 104 may utilize the remote resources to perform various functionality related to speech processing and/or synthesized playback communication. In some implementations, the speech recognizer 170 is located on the remote system 130 in addition to, or in lieu, of the assistant-enabled headphones 104. Upon the hotword detector 108 triggering the assistant-enabled headphones 104 to wake-up responsive to detecting the hotword 110 in the first query 106, the assistant-enabled headphones 104 may transmit the audio data 402 corresponding to the first query 106 to the remote system 130 via the network 120. Here, the assistant-enabled headphones 104 may transmit the portion of the audio data 402 that includes the hotword 110 for the remote system 130 to confirm the presence of the hotword 110. Alternatively, the assistant-enabled headphones 104 may transmit only the portion of the audio data 402 that corresponds to the portion of the first query 106 after the hotword 110 to the remote system 130, where the remote system 130 executes the speech recognizer 170 to perform speech recognition and returns a transcription of the audio data 402 to the assistant-enabled headphones 104.

With continued reference to FIGS. 1A-1C and 3, the query handler 300 may further include a natural language understanding (NLU) module 320 that performs semantic interpretation on the first query 106 to identify the query/command directed toward the assistant-enabled headphones 104 and/or one of the AEDs 103 within the environment. Specifically, the NLU module 320 identifies the words in the first query 106 identified by the speech recognizer 170, and performs semantic/query interpretation to identify any speech commands in the first query 106. The NLU module 320 of the assistant-enabled headphones 104 (and/or the remote system 130) may identify the words "what's the weather" as a command 118 specifying a first operation (i.e., identify the local weather) for the AED 103a (i.e., the first smart thermostat 103a) to perform, and the words "today" as a criteria for the AED 103a to provide the present weather for the area.

In some implementations, after the NLU module 320 identifies the words in the first query 106, the query handler 300 (i.e., the assistant arbitration routine 340) obtains a response 122 to the first query 106 from the AED 103a. In implementations where the NLU module 320 does not perform query interpretation to identify the AED 103a, the response 122 may convey response information 125 related to the performance of the operation. For example, the response information 125 may include an identifier of the AED 103a that performed the operation of providing the weather for the area.

The query handler 300 may next determine a particular direction located within the environment for a user-perceived source of the response information 125 relative to the assistant-enabled headphones 104. In the example shown in FIGS. 1A and 2A, based on the response information 125 including an identifier of the AED 103a, and the home graph 314, the assistant-arbitration routine 340 determines the particular direction located within the environment for the user-perceived source of the response 122 as the upper left corner of the first floor for the user 102 wearing the assistant-enabled headphones 104. For example, the assistant-arbitration routine 340 obtains the proximity information 107 associated with the assistant-enabled headphones 104 with respect to each of the AEDs 103 located within the environment. Here, the assistant-arbitration routine 340 executes the arbitration process to identify which one of the AEDs 103 is the user-perceived source by determining the particular direction for the user-perceived source relative to the assistant-enabled headphones 104 based on the proximity information 107 associated with the assistant-enabled headphones 104 and the identified assistant-enabled device 103 that includes the user-perceived source. In these examples, the assistant-arbitration routine 340 may receive a directional orientation of the assistant-enabled headphones 104 when the user 102 spoke the first query 106. Here, the assistant-arbitration routine 340 executes the arbitration process to identify the AED 103 that includes the user-perceived source based on the directional orientation of the assistant-enabled headphones 104 and the proximity information 107 associated with the assistant-enabled headphones 104 and each of the AEDs 103. In these examples, obtaining the directional orientation of the stereo headphones may include receiving directionality information (e.g., motion sensor data 17) measured by one or more motion sensors 15 implemented on the assistant-enabled headphones 104. For instance, determining the directional orientation of the assistant-enabled headphones 104 when the user 102 spoke the first query 106 is based on the motion sensor data 17 measured by the one or more motion sensors 15 implemented on the assistant-enabled headphones 104. Additionally or alternatively, at least one AED 103 within the environment captures (e.g., via a respective array of microphones), the streaming audio data 402 containing the first query 106 spoken by the user 102. Here, the at least one AED 103 performs beamforming on the respective captured streaming audio data 402 to extract the directional orientation of the assistant-enabled headphones 104 relative to the AED 103, where obtaining the directional orientation of the assistant-enabled headphones 104 includes receiving the directional orientation extracted by the at least one AED 103. In other words, the directional orientation of the assistant-enabled headphones 104 may be based on the audio data 402 uttered by the user 102 wearing the assistant-enabled headphones 104.

After determining the particular direction for the user-perceived source of the response information 125, the digital assistant 105 of the assistant-enabled headphones 104 may render output audio signals characterizing the response 122 to the first query 106 through the assistant-digital headphones 104 to produce a spatial playback sound-field 316 that maps the particular direction for the user-perceived source to a spatially disposed location 318 within the spatial playback sound-field 316. While not shown, the user 102 perceives the response 122 to the first query 106 as emanating from the spatially disposed location 318 within the spatial playback sound-field 316. For instance, the digital assistant 105 may generate synthesized speech for audible output from the integrated loudspeakers 18a, 18b of the assistant-enabled headphones 104 that conveys the response 122 as emanating from the direction of the AED 103a (i.e., the first smart thermostat 103a) relative to the assistant-enabled headphones 104 within the environment.

In some implementations, the query handler 300 determines, based on the proximity information 107 in the home graph 310 that is associated with the assistant-enabled headphones 104 and the identified AED 103a that includes the user-perceived source, a distance score associated with the user-perceived source that indicates a distance between the assistant-enabled headphones 104 and the user-perceived source. Here, the query handler 300 may adjust a volume level of the spatial playback sound-field 316 based on the distance score associated with the user-perceived source. As shown in FIG. 1A, because the AED 103a is relatively far away from the assistant-enabled headphones 104, the query handler 300 may decrease the volume of the spatial playback sound-field 316 to indicate the AED 103a is far away. Conversely, where an AED 104 is relatively close to the assistant-enabled headphones 104, the query handler 300 may increase the volume of the spatial playback sound-field 316 to indicate the AED 103 is nearby. Similarly, the query handler 300 may adjust a volume level of the spatial playback sound-field 316 based on a speaking volume of the user 102 that issued the first query 106. For example, if the user 102 issues a query addressing the smart speaker 103d that is upstairs (i.e., far from the user 102) in the environment, the user 102 may issue the query louder than an indoor speaking voice. Moreover, the assistant arbitration process 340 may consider the volume of the voice of the user 102 when determining which AED 103 and/or assistant 105 the user 102 intends to address. For instance, if the user 102 speaks louder, the assistant arbitration process 340 may imply that the user 102 intends for an AED 103 that is further away from the user 102 to respond to the query. While the microphone 16 of the assistant-enabled headphones 104 captures the query regardless of the volume of the voice of the user 102, the query handler 300 may adjust the volume level of the spatial playback sound-field 316 to match the volume of level of the query issued by the user 102. Advantageously, because the microphone 16 of the assistant-enabled headphones 104 captures the first query 106, the user 102 need not be within range of a microphone of an AED 103 to issue a query instructing the AED 103 to perform an operation.

In some implementations, the user 102 issues a query requesting more than one user-perceived source of the responsive information relative to the assistant-enabled headphones 104. For example, the user 102 may ask the first smart thermostat 103a and the second smart thermostat 103f to provide the temperature of their respective environments. The query handler 300 may receive a response from the first smart thermostat 103a and the second smart thermostat 103f, where the response includes metadata identifying the identity of each respective AED 103. In these examples, the assistant arbitration routine 340 determines another particular direction for another user-perceived source of the response information 125 relative to the assistant-enabled headphones 104, where the other user-perceived source is located in the environment at a different location than the user-perceived source. Here, the spatial playback sound-field 316 produced by rendering the output audio signals through the assistant-enabled headphones 104 further maps the other particular direction for the other user-perceived source to a different spatially disposed location (not shown) within the spatial playback sound-field 316. The user 102 may perceive the response to the query as emanating from the different spatially disposed locations within the spatial playback sound-field 316.

Referring now to FIG. 1B, while the user 102 is wearing the assistant-enabled headphones 104, the user 102 issues a second query 146 specifying a second operation for the digital assistant 105 to perform. In the example shown, the user 102 issues the second query 146 "How much time is left on the timer" including the command 119 for the digital assistant 105 to perform the operation of determining the time remaining on a timer within the environment. Based on receiving the second query 146, the NLU module 320 executing on the assistant-enabled headphones 104 (and/or executing on the remote system 130) may identify the words "how much time is left on the timer" as a command 119 specifying a second operation (i.e., identify the remaining time in a timer). Here, the home graph 314 may indicate that the user 102 is looking in the direction of the AEDs 103a-c when the user 102 issues the second query 146. However, based on the device context 111 of each of the respective AEDs 103, the assistant-arbitration routine 340 identifies the AED 103c (i.e., the smart oven 103c) as the AED 103 that includes the user-perceived source. In other words, the home graph identifies the AED 103 that includes the user-perceived source based on the respective set of available operations indicated by the device context 111 associated with each corresponding AED 103 of the plurality of AEDs 103. Specifically, the device context 111 of the AED 103c may indicate that the smart oven 103c has an active timer as an available operation, while the device context of the AEDs 103a, 103b indicates that a timer operation is unavailable. Based on this, the assistant-arbitration routine 340 determines that the AEDs 103a, 103b must not be the AED 103 that includes the user-perceived source because the AEDs 103a, 103b cannot provide a response to the second query 146.

The query handler 300 may receive a response 124 to the second query 146 and determine a particular direction located within the environment for the user-perceived source of the response 124 relative to the assistant-enabled headphones 104. In the example shown in FIGS. 1B and 2B, based on the device context 111 identifying the AED 103c as the target AED 103, and the home graph 314, the assistant-arbitration routine 340 determines the particular direction located within the environment for the user-perceived source of the response 124 as the lower left corner of first floor the user 102 wearing the assistant-enabled headphones 104.

After determining the particular direction for the user-perceived source of the response 124, the digital assistant 105 of the assistant-enabled headphones 104 may render output audio signals characterizing the response 124 to the second query 146 through the assistant-digital headphones 104 to produce a spatial playback sound-field 316 that maps the particular direction for the user-perceived source to a spatially disposed location 318 within the spatial playback sound-field 316. While not shown, the user 102 perceives the response 124 to the second query 146 as emanating from the spatially disposed location 318 within the spatial playback sound-field 316. For instance, the digital assistant 105 may generate synthesized speech for audible output from the integrated loudspeakers 18a, 18b of the assistant-enabled headphones 104 that conveys the direction of the AED 103c (i.e., the smart oven 103c) relative to the assistant-enabled headphones 104 within the environment.

In some implementations, the digital assistant 105 receives a notification for the user 102 issued by an AED 103 located in the environment, and determines a particular direction for the AED 103 relative to the assistant-enabled headphones 104. For example, the user 102 may set a timer when facing the AED 103c (i.e., the smart oven 103c). Later, when the timer goes off (thereby generating the notification), the query handler 300 may determine that the particular direction remains in the direction the user 102 was originally facing when the timer was set. Alternatively, the user 102 may set a timer when facing away from the AED 103c, however the query handler 300 may determine a particular direction for the AED 103c that indicates the location of the AED 103c relative to the assistant-enabled headphones 104 within the environment. Here, the query handler 300 renders another output audio signal characterizing the notification through the assistant-enabled headphones 104 to produce another spatial playback sound-field 316 that maps the particular direction for the AED 103c to another spatially disposed location within the spatial playback sound-field 316 than the user 102 was facing when the user 102 set the timer. Here, the user 102 perceives the notification as emanating from the other spatially disposed location (e.g., the location of the AED 103c) within the other spatial playback sound-field 316. In some examples, the 102 may view the notification on an available AED 103 in the environment (e.g., a smart television 103b). For instance, the digital assistant 105 receives the notification for the user "you have one new message", and renders another output audio signal characterizing the notification through the assistant-enabled headphones 104 to produce another spatial playback sound-field that maps the particular direction for the AED 103 to the spatially disposed location of the smart television 103b within the spatial playback sound-field 316. In these instances, the smart television 103b may display the notification (i.e., "one new message") itself, or it may display the notification as well as the contents of the notification (e.g., the body of the new message).

Referring now to FIG. 1C, while the user 102 is wearing the assistant-enabled headphones 104, the user 102 issues a third query 148 specifying a third operation for the digital assistant 105 to perform. In the example shown, the user 102 issues the third query 148 "Play Brat Pack" including the command 121 for the digital assistant 105 to perform the operation of playing music. In this example, the user 102 may either include a hotword 110 in the third query 148 or perform a predefined movement (i.e., detected by the motion sensor 15 in the AED 104) to trigger a particular digital assistant. For instance, the user 102 may invoke the music assistant 105b by looking to the right, or invoke the general assistant 105a by looking up.

In the example, the user 102 looks to the right in addition to issuing the third query 148 "Play Brat Pack". Based on the motion sensor data 17 including metadata indicating that the user 102 looked to the right, the assistant arbitration routine 340 identifies the music assistant 105b as a target AED 103 to perform the operation. Here, the assistant arbitration routine 340 obtains special audio preferences 332 of the user 102. For instance, the assistant arbitration routine 340 identifies the music assistant 105b as the target AED 103 by using the spatial audio preferences 332 that match the particular direction (i.e., right) identified by the metadata with the predefined direction in the user directional mapping that maps to the music assistant 105b.

The NLU module 320 executing on the assistant-enabled headphones 104 (and/or executing on the remote system 130) may next identify the words "Play Brat Pack" as the command 121 specifying the third operation (i.e., play music). As shown in FIGS. 1C and 2C, the query handler 300 may obtain, from the music assistant 105b, the response 126 to the third query 148 by queuing up the song "Brat Pack" either from a streaming service (not shown) or from music stored on the assistant-enabled headphones 104. In some implementations, the assistant arbitration routine 340 determines, based on the spatial audio preferences 332 of the user 102, a spatially disposed location 318 within a playback sound-field 316 for the user 102 to perceive as a sound-source of the response 126 to the third query 148.

After determining the spatially disposed location 318 within the playback sound-field 316 for the user 102 to perceive as the sound-source of the response 126 to the third query 148, the music assistant 105b of the assistant-enabled headphones 104 may render output audio signals characterizing the response 126 to the third query 148 through the assistant-digital headphones 104 to produce the playback sound-field 316. While not shown, the user 102 perceives the response 126 to the query 148 as emanating from the sound-source at the spatially disposed location 318 within the playback sound-field 316. For instance, the music assistant 105b may stream the music as audible output from the integrated loudspeakers 18a, 18b of the assistant-enabled headphones 104 that conveys the direction of the AED 103a (i.e., the first smart thermostat 103a) relative to the assistant-enabled headphones 104 within the environment.

In some implementations, rather than receiving the spatial audio preferences 332 including the predefined direction in the user directional mapping, the spatial audio preferences 332 include the digital assistant mapping that maps each digital assistant 105 in a group of one or more available digital assistants 105 associated with the user 102 to a respective different spatially disposed location 318 within playback sound-fields 316 produced by the assistant-enabled headphones 104. Here, determining the spatially disposed location 318 within the playback sound-field 316 for the user 102 to perceive as the sound-source includes selecting the spatially disposed location 318 as the respective different spatially disposed location 318 that maps to the music assistant 105b in the group of the one or more available digital assistants 105. For example, the user 102 may pre-program the assistant-enabled headphones 104 with the spatial audio preference 332 to always play responses/messages from the music assistant 105b via the loudspeaker 18b, while all responses for the general assistant 105a are played via the loudspeaker 18a.

In other examples, rather than receiving the spatial audio preferences 332 including the predefined direction in the user directional mapping, the spatial audio preferences 332 include phrase mapping that maps each of a plurality of different predefined phrases to a respective digital assistant 105 in the group if one or more available digital assistants 105. In these examples, the assistant arbitration routine 340 identifies the target digital assistant 105 based on at least one of a particular phrase detected in the audio data 402 that matches the predefined phrase in the phrase mapping that maps to the music assistant 105b, or the particular phrase recognized in a transcription of the audio data 402 that matches the predefined phrase in the phrase mapping that maps to the music assistant 105b. For example, the arbitration routine 340 may map the phrase "play" in the third query 148 and detected in the audio data 402 as a match for a predefined phrase in the phrase mapping that maps to the music assistant 105b. By the same notion, the user may invoke the music assistant 105b by speaking a first predetermined hotword "Hey music assistant" and may invoke the general assistant 105b by speaking a second predetermined hotword "Hey computer". As such, the first predetermined hotword may serve as the predefined phrase that maps to the music assistant and the second predetermined hotword may serve as the predefined phrase that maps to the general assistant.

Here, the music assistant 105b may stream the music from a streaming service (not shown) or the music assistant 105 may instruct the first AED 104a to play music stored on the first AED 104a. While the example long-standing operation 111 includes music playback, the long-standing operation may include other types of media playback, such as video, podcasts, and/or audio books.

While the examples primarily refer to determining a target AED 103 to convey spatial audio of which AED 103 is responding to queries, spatial audio may also be used to help the user 102 locate an AED 103 within the environment. For example, if a user speaks "Hey Smart Speaker" while wearing their stereo headphones 104, the response from the smart speaker may be perceived as coming from the location that the smart speaker AED 103 is currently located. Moreover, applying spatial audio may help anchor a location of an initial query so that the user 102 does not lose track of what AEDs 103 are currently active/performing operations by ensuring that any respective notifications or updates emanate from the same location as the initial query.

Figure 4:
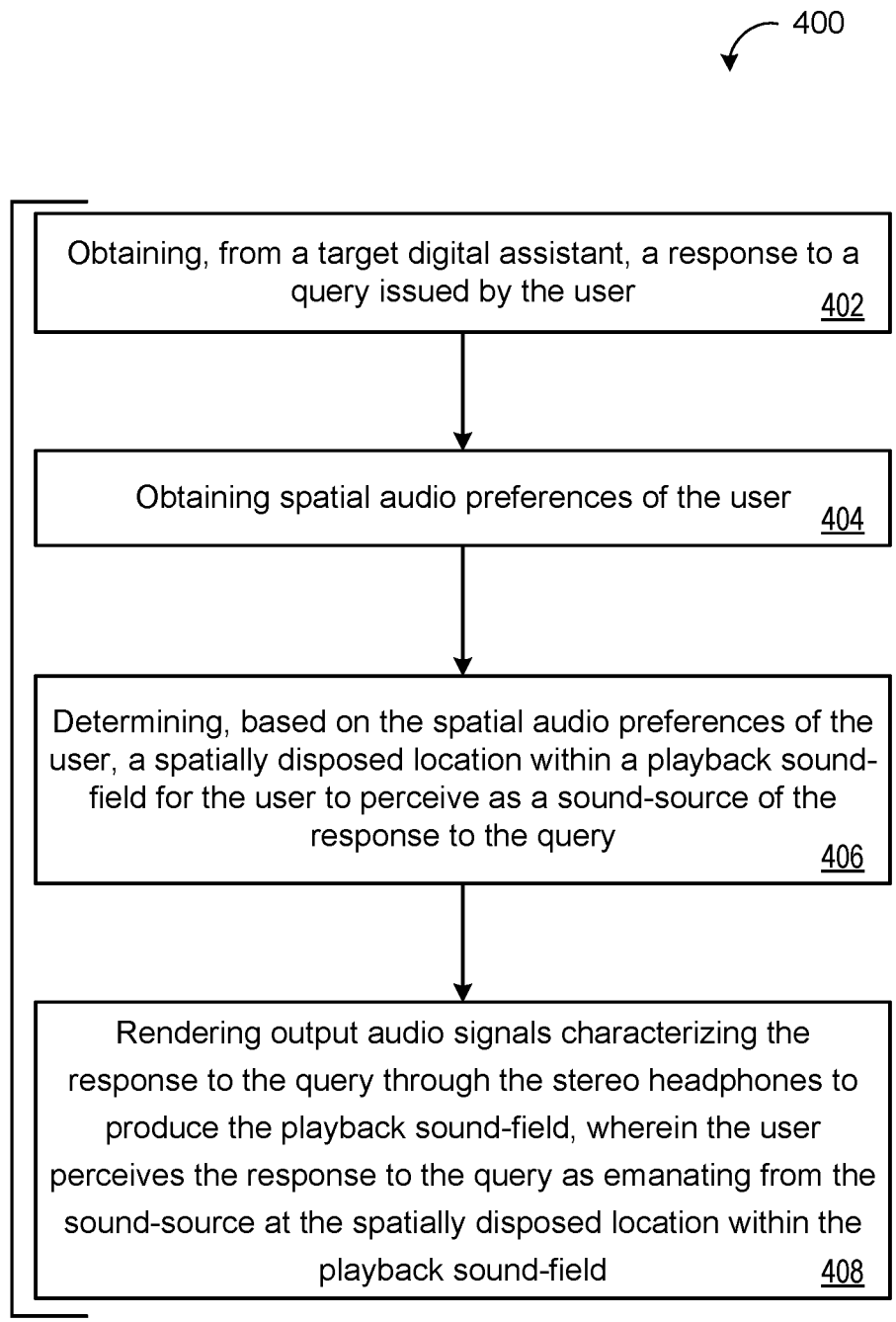
FIG. 4 is a flowchart of an example arrangement of operations for a method of applying spatial audio to query responses from digital assistants based on spatial audio preferences of a user.

FIG. 4 includes a flowchart of an example arrangement of operations for a method 400 of using spatial audio to place responses from assistant enable devices in semantically meaningful positions around a user. At operation 402, while a user 102 is wearing stereo headphones 104 in an environment, the method 400 includes obtaining, from a target digital assistant 105, a response 126 to a query 148 issued by the user 102. At operation 404, the method 400 also includes obtaining spatial audio preferences 332 of the user 102.

Based on the spatial audio preferences 332 of the user 102, the method 400 further includes, at operation 406, determining a spatially disposed location 318 within a playback sound-field 316 for the user 102 to perceive as a sound-source of the response 126 to the query 128. At operation 408, the method 400 also includes rendering output audio signals characterizing the response 126 to the query 148 through the stereo headphones 104 to produce the playback sound-field 316. Here, the user 102 perceives the response 126 to the query 148 as emanating from the sound-source at the spatially disposed location 318 within the playback sound-field 316.

Figure 5:
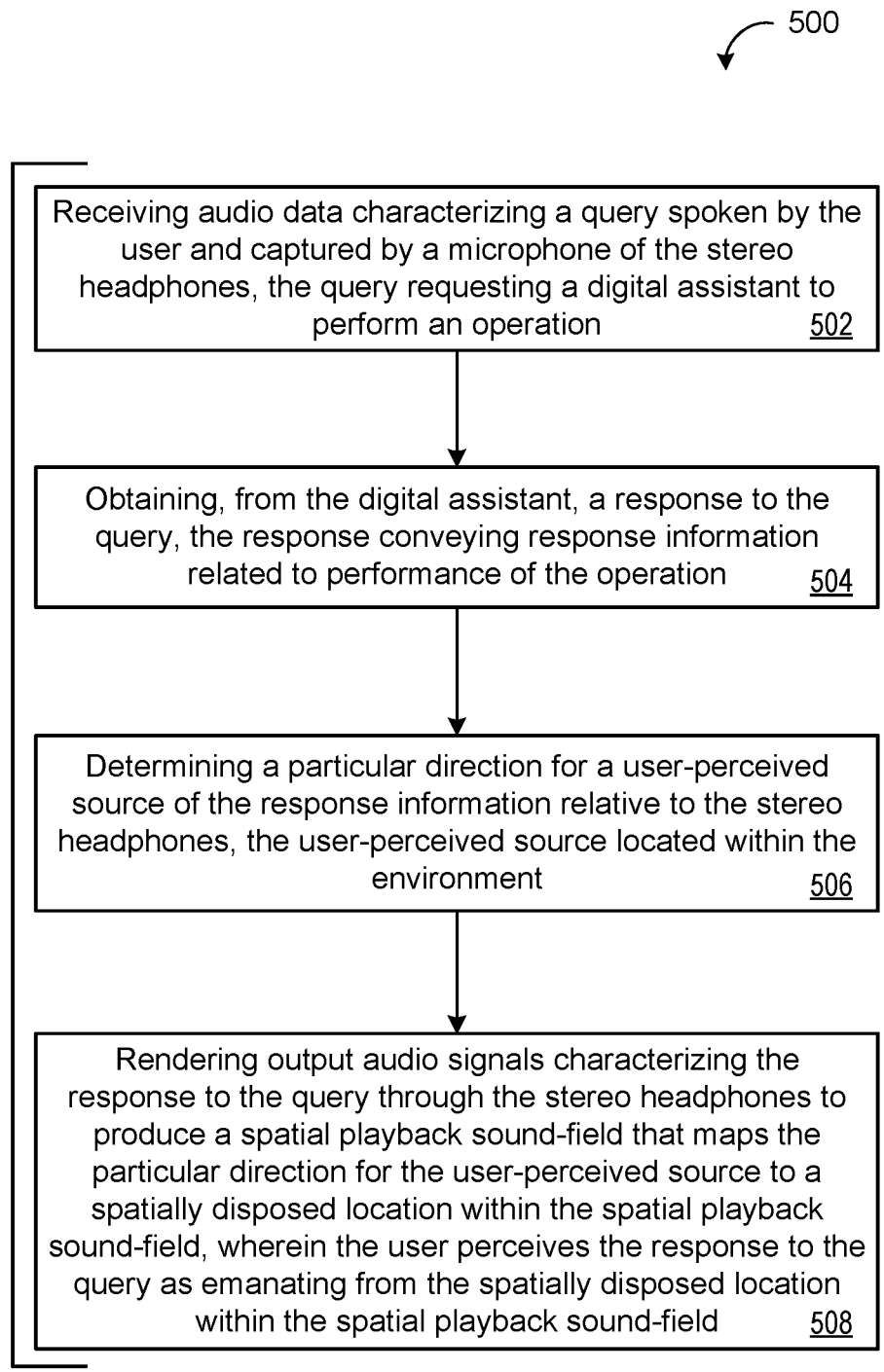
FIG. 5 is a flowchart of an example arrangement of operations for a method of applying spatial audio to a query response from a digital assistant based on a location of the digital assistant.

FIG. 5 includes a flowchart of an example arrangement of operations for a method 500 of using spatial audio to provide responses from assistant enable devices in an environment of a user. At operation 502, while a user 102 is wearing stereo headphones 104 in an environment, the stereo headphones 104 including a pair of integrated loudspeakers 18a, 18b each disposed proximate to a respective ear of the user 102, the method 500 includes receiving audio data 402 characterizing a query 146 spoken by the user 102 and captured by a microphone 16 of the stereo headphones 104. Here, the query 146 requests a digital assistant 105 to perform an operation. The method 500 also includes, at operation 504, obtaining, from the digital assistant 105, a response 124 to the query 146. Here, the response 124 to the query 146 conveys response information 125 related to performance of the operation.

At operation 506, the method 500 also includes determining a particular direction for a user-perceived source of the response information 125 relative to the stereo headphones 104. The user-perceived source is located within the environment. At operation 508, the method 500 further includes rendering output audio signals characterizing the response 124 to the query 146 through the stereo headphones 104 to produce a spatial playback sound-field 316 that maps the particular direction for the user-perceived source to a spatially disposed location 318 within the spatial playback sound-field 316. Here, the user 102 perceives the response 124 to the query as emanating from the spatially disposed location 318 within the spatial playback sound-field 316.

Figure 6:
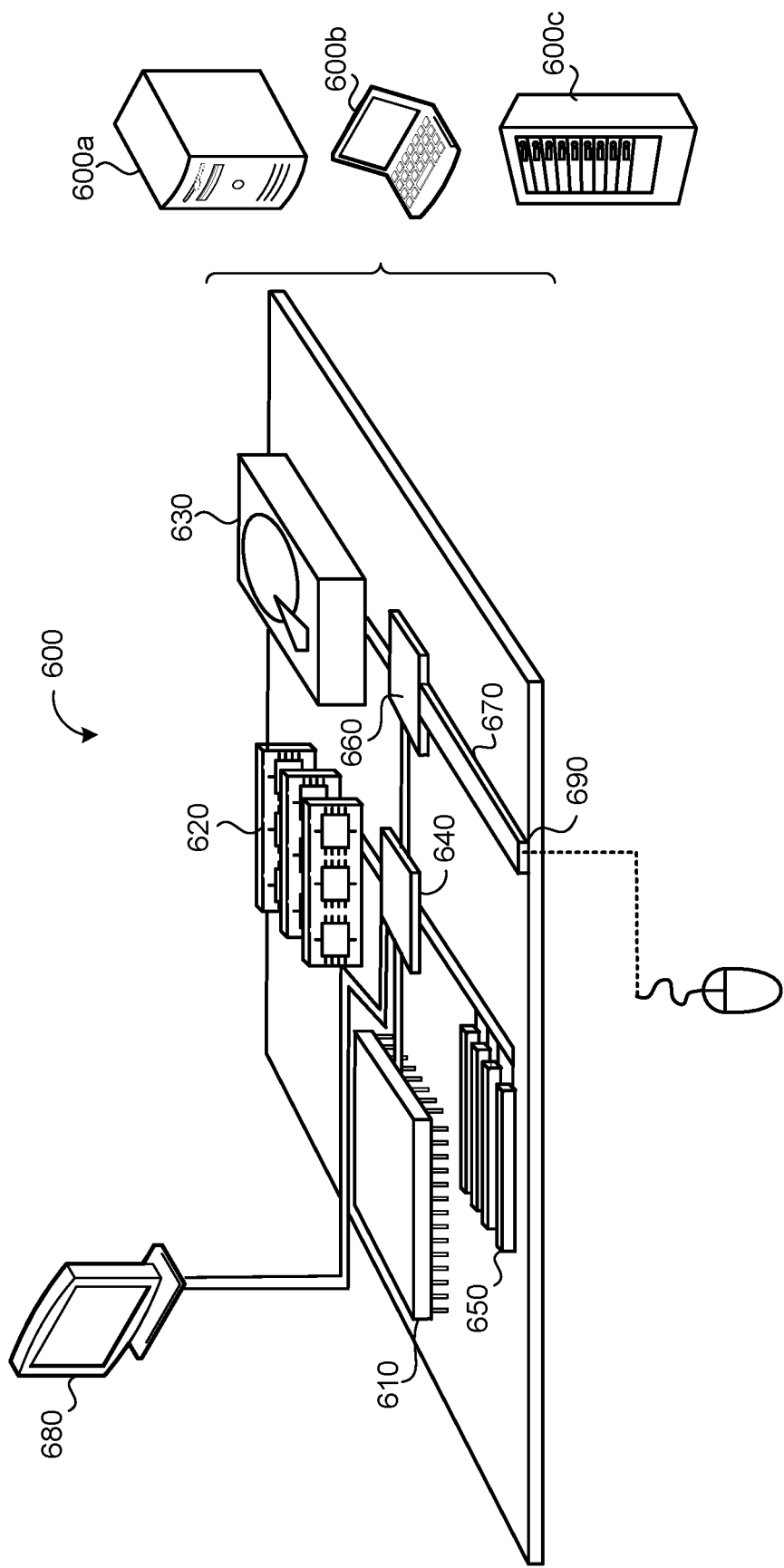
FIG. 6 is a schematic view of an example computing device that may be used to implement the systems and methods described herein.

FIG. 6 is a schematic view of an example computing device 600 that may be used to implement the systems and methods described in this document. The computing device 600 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 600 includes a processor 610, memory 620, a storage device 630, a high-speed interface/controller 640 connecting to the memory 620 and high-speed expansion ports 650, and a low speed interface/controller 660 connecting to a low speed bus 670 and a storage device 630. Each of the components 610, 620, 630, 640, 650, and 660, are interconnected using various busses, and may be mounted on a common motherboard or in other manners as appropriate. The processor 610 (e.g., data processing hardware 10 and/or remote data processing hardware 132 of FIGS. 1A-1C) can process instructions for execution within the computing device 600, including instructions stored in the memory 620 or on the storage device 630 to display graphical information for a graphical user interface (GUI) on an external input/output device, such as display 680 coupled to high speed interface 640. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 620 (e.g., memory hardware 12 and/or remote memory hardware 134 of FIGS. 1A-1C) stores information non-transitorily within the computing device 600. The memory 620 may be a computer-readable medium, a volatile memory unit(s), or non-volatile memory unit(s). The non-transitory memory 620 may be physical devices used to store programs (e.g., sequences of instructions) or data (e.g., program state information) on a temporary or permanent basis for use by the computing device 600. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 630 is capable of providing mass storage for the computing device 600. In some implementations, the storage device 630 is a computer-readable medium. In various different implementations, the storage device 630 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 620, the storage device 630, or memory on processor 610.

The high speed controller 640 manages bandwidth-intensive operations for the computing device 600, while the low speed controller 660 manages lower bandwidth-intensive operations. Such allocation of duties is exemplary only. In some implementations, the high-speed controller 640 is coupled to the memory 620, the display 680 (e.g., through a graphics processor or accelerator), and to the high-speed expansion ports 650, which may accept various expansion cards (not shown). In some implementations, the low-speed controller 660 is coupled to the storage device 630 and a low-speed expansion port 690. The low-speed expansion port 690, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 600a or multiple times in a group of such servers 600a, as a laptop computer 600b, or as part of a rack server system 600c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method executing on data processing hardware that causes the data processing hardware to perform operations comprising:
while a user is wearing stereo headphones in an environment, the stereo headphones comprising a pair of integrated loudspeakers each disposed proximate to a respective ear of the user:
receiving audio data characterizing a query spoken by the user and captured by a microphone of the stereo headphones, the query requesting a digital assistant to perform an operation;
obtaining, from the digital assistant, a response to the query, the response conveying response information related to performance of the operation;
determining a particular direction for a user-perceived source of the response information relative to the stereo headphones, the user-perceived source located within the environment; and
rendering output audio signals characterizing the response to the query through the stereo headphones to produce a spatial playback sound-field that maps the particular direction for the user-perceived source to a spatially disposed location within the spatial playback sound-field, wherein the user perceives the response to the query as emanating from the spatially disposed location within the spatial playback sound-field.

2. The computer-implemented method of claim 1, wherein the operations further comprise:
obtaining proximity information associated with the headphones and each of a plurality of assistant-enabled devices located within the environment, each corresponding assistant-enabled device of the plurality of assistant-enabled devices in communication with the stereo headphones; and
executing an arbitration process to identify which one of the plurality of assistant-enabled devices comprises the user-perceived source;
wherein determining the particular direction for the user-perceived source relative to the stereo headphones is based on the proximity information associated with the headphones and the identified assistant-enabled device that comprises the user-perceived source.

3. The computer-implemented method of claim 2, wherein the operations further comprise:
obtaining a directional orientation of the stereo headphones when the user spoke the query,
wherein the arbitration processes identifies the assistant-enabled device that comprises the user-perceived source based on the directional orientation of the stereo headphones and the proximity information associated with the stereo headphones and each of the plurality of assistant-enabled devices.

4. The computer-implemented method of claim 3, wherein obtaining the directional orientation of the stereo headphones comprises:
receiving directionality information measured by one or more sensors implemented on the stereo headphones; and
determining the directional orientation of the stereo headphones when the user spoke the query based on the directionality information measured by the one or more sensors implemented on the stereo headphones.

5. The computer-implemented method of claim 3, wherein:
at least one assistant-enabled device of the plurality of assistant-enabled devices within the environment:
captures, via a respective array of microphones, streaming audio containing the query spoken by the user; and performs beamforming on the captured streaming audio to extract the directional orientation of the stereo headphones relative to the at least one assistant-enabled device; and obtaining the directional orientation of the stereo headphones comprises receiving the directional orientation of the stereo headphones extracted by the at least one assistant-enabled device.

6. The computer-implemented method of claim 2, wherein the operations further comprise:

obtaining a transcription of the query spoken by the user; and performing query interpretation on the transcription, wherein the arbitration processes identifies the assistant-enabled device that comprises the user-perceived source based on the query interpretation performed on the transcription.

7. The computer-implemented method of claim 2, wherein:

each corresponding assistant-enabled device of the plurality of assistant-enabled devices is configured to perform a respective set of available operations; and identifying the assistant-enabled device that comprises the user-perceived source is further based on the respective set of available operations associated with each corresponding assistant-enabled device of the plurality of assistant-enabled devices.

8. The computer-implemented method of claim 2, wherein the operations further comprise:

determining, based on the proximity information associated with the stereo headphones and the identified assistant-enabled device that comprises the user-perceived source, a distance score associated with the user-perceived source, the distance score indicating a distance between the stereo headphones and the user-perceived source; and adjusting a volume level of the spatial playback sound-field based on the distance score associated with the user-perceived source.

9. The computer-implemented method of claim 1, wherein the operations further comprise:

determining another particular direction for another user-perceived source of the response information relative to the stereo headphones, the other user-perceived source located in the environment at a different location than the user-perceived source, wherein the spatial playback sound-field produced by rendering the output audio signals through the stereo headphones further maps the other particular direction for the other user-perceived source to a different spatially disposed location within the spatial playback sound-field, wherein the user also perceives the response to the query as emanating from the different spatially disposed location within the spatial playback sound-field.

10. The computer-implemented method of claim 1, wherein the operations further comprise, while the user is wearing the stereo headphones:

receiving a notification for the user issued by an assistant-enabled device located in the environment;

determining a particular direction for the assistant-enabled device relative to the stereo headphones; and rendering another output audio signal characterizing the notification through the stereo headphones to produce another spatial playback sound-field that maps the particular direction for the assistant-enabled device to another spatially disposed location within the spatial playback sound-field, wherein the user perceives the notification as emanating from the other spatially disposed location within the other spatial playback sound-field.

11. A system comprising:

data processing hardware; and memory hardware in communication with the data processing hardware, the memory hardware storing instructions that when executed on the data processing hardware cause the data processing hardware to perform operations comprising:

while a user is wearing stereo headphones in an environment, the stereo headphones comprising a pair of integrated loudspeakers each disposed proximate to a respective ear of the user:

receiving audio data characterizing a query spoken by the user and captured by a microphone of the stereo headphones, the query requesting a digital assistant to perform an operation;

obtaining, from the digital assistant, a response to the query, the response conveying response information related to performance of the operation;

determining a particular direction for a user-perceived source of the response information relative to the stereo headphones, the user-perceived source located within the environment; and rendering output audio signals characterizing the response to the query through the stereo headphones to produce a spatial playback sound-field that maps the particular direction for the user-perceived source to a spatially disposed location within the spatial playback sound-field, wherein the user perceives the response to the query as emanating from the spatially disposed location within the spatial playback sound-field.

12. The system of claim 11, wherein the operations further comprise:

obtaining proximity information associated with the headphones and each of a plurality of assistant-enabled devices located within the environment, each corresponding assistant-enabled device of the plurality of assistant-enabled devices in communication with the stereo headphones; and executing an arbitration process to identify which one of the plurality of assistant-enabled devices comprises the user-perceived source;

wherein determining the particular direction for the user-perceived source relative to the stereo headphones is based on the proximity information associated with the headphones and the identified assistant-enabled device that comprises the user-perceived source.

13. The system of claim 12, wherein the operations further comprise:

obtaining a directional orientation of the stereo headphones when the user spoke the query, wherein the arbitration processes identifies the assistant-enabled device that comprises the user-perceived source based on the directional orientation of the stereo headphones and the proximity information associated with the stereo headphones and each of the plurality of assistant-enabled devices.

14. The system of claim 13, wherein obtaining the directional orientation of the stereo headphones comprises:

receiving directionality information measured by one or more sensors implemented on the stereo headphones; and determining the directional orientation of the stereo headphones when the user spoke the query based on the directionality information measured by the one or more sensors implemented on the stereo headphones.

15. The system of claim 13, wherein:
at least one assistant-enabled device of the plurality of assistant-enabled devices within the environment:
  captures, via a respective array of microphones, streaming audio containing the query spoken by the user; and
  performs beamforming on the captured streaming audio to extract the directional orientation of the stereo headphones relative to the at least one assistant-enabled device; and
obtaining the directional orientation of the stereo headphones comprises receiving the directional orientation of the stereo headphones extracted by the at least one assistant-enabled device.

16. The system of claim 12, wherein the operations further comprise:
obtaining a transcription of the query spoken by the user; and
performing query interpretation on the transcription,
wherein the arbitration processes identifies the assistant-enabled device that comprises the user-perceived source based on the query interpretation performed on the transcription.

17. The system of claim 12, wherein:
each corresponding assistant-enabled device of the plurality of assistant-enabled devices is configured to perform a respective set of available operations; and
identifying the assistant-enabled device that comprises the user-perceived source is further based on the respective set of available operations associated with each corresponding assistant-enabled device of the plurality of assistant-enabled devices.

18. The system of claim 12, wherein the operations further comprise:
determining, based on the proximity information associated with the stereo headphones and the identified assistant-enabled device that comprises the user-perceived source, a distance score associated with the user-perceived source, the distance score indicating a distance between the stereo headphones and the user-perceived source; and
adjusting a volume level of the spatial playback sound-field based on the distance score associated with the user-perceived source.

19. The system of claim 11, wherein the operations further comprise:
determining another particular direction for another user-perceived source of the response information relative to the stereo headphones, the other user-perceived source located in the environment at a different location than the user-perceived source,
wherein the spatial playback sound-field produced by rendering the output audio signals through the stereo headphones further maps the other particular direction for the other user-perceived source to a different spatially disposed location within the spatial playback sound-field, wherein the user also perceives the response to the query as emanating from the different spatially disposed location within the spatial playback sound-field.

20. The system of claim 11, wherein the operations further comprise, while the user is wearing the stereo headphones:
receiving a notification for the user issued by an assistant-enabled device located in the environment;
determining a particular direction for the assistant-enabled device relative to the stereo headphones; and
rendering another output audio signal characterizing the notification through the stereo headphones to produce another spatial playback sound-field that maps the particular direction for the assistant-enabled device to another spatially disposed location within the spatial playback sound-field, wherein the user perceives the notification as emanating from the other spatially disposed location within the other spatial playback sound-field.

* * * * *